United States Patent
Schedlbauer

(10) Patent No.: US 11,724,821 B2
(45) Date of Patent: Aug. 15, 2023

(54) HELICOPTER SEARCH LIGHT AND METHOD OF OPERATING A HELICOPTER SEARCH LIGHT

(71) Applicant: Goodrich Lighting Systems GmbH, Bertramstrasse (DE)

(72) Inventor: Gregor Schedlbauer, Ulm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 316 days.

(21) Appl. No.: 17/206,232

(22) Filed: Mar. 19, 2021

(65) Prior Publication Data
US 2021/0292003 A1    Sep. 23, 2021

(30) Foreign Application Priority Data
Mar. 20, 2020 (EP) ................................ 20164515

(51) Int. Cl.
| | |
|---|---|
| B64D 47/04 | (2006.01) |
| H04N 13/239 | (2018.01) |
| B64D 47/02 | (2006.01) |
| F21V 14/02 | (2006.01) |
| H04N 5/33 | (2023.01) |
| G06V 40/10 | (2022.01) |

(52) U.S. Cl.
CPC ............ *B64D 47/04* (2013.01); *B64D 47/02* (2013.01); *F21V 14/02* (2013.01); *G06V 40/10* (2022.01); *H04N 5/33* (2013.01); *H04N 13/239* (2018.05)

(58) Field of Classification Search
CPC ...... B64D 47/04; B64D 47/02; H04N 13/239; H04N 5/33; G06V 40/10
See application file for complete search history.

(56) References Cited

U.S. PATENT DOCUMENTS

| | | | | |
|---|---|---|---|---|
| 5,465,142 A | * | 11/1995 | Krumes | G01S 17/933 |
| | | | | 359/201.1 |
| 5,781,229 A | * | 7/1998 | Zediker | H04N 13/363 |
| | | | | 348/E13.058 |

(Continued)

FOREIGN PATENT DOCUMENTS

| | | |
|---|---|---|
| EP | 0789846 A2 | 8/1997 |
| EP | 2832647 A1 | 2/2015 |

(Continued)

OTHER PUBLICATIONS

Abstract of EP3689755A1.
Extended European Search Report for International Application No. 20164515.7 dated Sep. 16, 2020, 9 pages.

*Primary Examiner* — Bryon T Gyllstrom
(74) *Attorney, Agent, or Firm* — Cantor Colburn LLP

(57) ABSTRACT

A helicopter search light includes a movable light head comprising: at least one light source and at least one optical element, which are configured for emitting a search light beam; at least two radiation sensors arranged in a preset distance (d) from each other. The radiation sensors are configured for detecting electromagnetic radiation and providing corresponding sensor signals. The system also includes an image processing module configured for receiving the sensor signals provided by the at least two radiation sensors and generating enhanced image data from said sensor signals and a controller configured for controlling movement of the movable light head depending on said enhanced image data.

15 Claims, 3 Drawing Sheets

(56) References Cited

U.S. PATENT DOCUMENTS

| | | | |
|---|---|---|---|
| 6,079,862 | A | 6/2000 | Kawashima et al. |
| 6,962,423 | B2 | 11/2005 | Hamilton et al. |
| 8,081,797 | B2 * | 12/2011 | Bergeron .............. G06V 10/143 |
| | | | 382/165 |
| 8,274,226 | B1 * | 9/2012 | Sikora ................... B60R 1/1207 |
| | | | 362/464 |
| 8,581,982 | B1 | 11/2013 | Haley et al. |
| 8,996,203 | B2 | 3/2015 | Jungwirth et al. |
| 9,635,739 | B2 | 4/2017 | Schoen et al. |
| 9,718,560 | B2 | 8/2017 | Lapujade et al. |
| 9,857,066 | B2 * | 1/2018 | Owens .................... F21V 29/74 |
| 9,884,691 | B2 * | 2/2018 | Jha ......................... B64D 47/02 |
| 10,180,246 | B2 | 1/2019 | Giffen |
| 10,246,199 | B2 | 4/2019 | Millet et al. |
| 2002/0044204 | A1 | 4/2002 | Zurl et al. |
| 2018/0244387 | A1 * | 8/2018 | Russell ................ G08G 5/0021 |
| 2019/0359349 | A1 | 11/2019 | Hessling-Von Heimendahl |

FOREIGN PATENT DOCUMENTS

| | | |
|---|---|---|
| EP | 3269596 A1 | 1/2018 |
| EP | 3689755 A1 | 8/2020 |
| WO | 9614587 A2 | 5/1996 |
| WO | 0049331 A2 | 8/2000 |

\* cited by examiner

HELICOPTER SEARCH LIGHT AND METHOD OF OPERATING A HELICOPTER SEARCH LIGHT

FOREIGN PRIORITY

This application claims priority to European Patent Application No. 20164515.7 filed Mar. 20, 2020, the entire contents of which is incorporated herein by reference.

TECHNICAL FIELD

The invention relates to lighting systems of helicopters. In particular, it relates to a helicopter search light, to a helicopter comprising such a search light, and to a method of operating a helicopter search light.

BACKGROUND

Helicopters often have movable exterior lights, in particular helicopter search lights, which are configured for emitting a light beam for enhancing the visibility of target objects, such as human beings, under adverse visibility conditions, e.g. during the night or when the helicopter is flying through fog, rain, etc.

Due to movements of the helicopter and/or the target object, it may be difficult to keep the light beam focused on the target object. As a result, the light beam may deviate from the target object, thus no longer illuminating the target object. In consequence, the helicopter crew may lose sight of the target object.

Accordingly, it would be beneficial to provide a helicopter search light that allows for illuminating a target object more easily and reliably, even when at least one of the helicopter and the target object is moving.

BRIEF DESCRIPTION

Exemplary embodiments of the invention include a helicopter search light comprising: a movable light head which comprises at least one light source and at least one optical element, which are configured for emitting a search light beam; at least two radiation sensors arranged in a preset distance from each other, the radiation sensors being configured for detecting electromagnetic radiation and providing corresponding sensor signals; an image processing module configured for receiving the sensor signals provided by the at least two radiation sensors and generating enhanced image data from said sensor signals; and a controller which is configured for controlling movement of the movable light head depending on said enhanced image data.

Exemplary embodiments of the invention further include a helicopter equipped with at least one helicopter search light according to an exemplary embodiment of the invention.

Exemplary embodiments of the invention also include a method of operating a helicopter search light having a movable light head, wherein the method includes: emitting a search light beam from the movable light head; detecting electromagnetic radiation from the environment with the at least two radiation sensors, which are arranged in a preset distance from each other in the movable light head, and providing corresponding sensor signals; generating enhanced image data from said sensor signals; and controlling movement of the movable light head depending on said enhanced image data. The method of operating a helicopter search light in particular includes controlling movement of the helicopter search light in an automated manner and compensating for relative movements between the target object and the helicopter. The enhanced image data may also be provided to a human operator, in order to allow the operator to control/supervise the automated control of the helicopter search light in an efficient manner.

The enhanced image data includes added information, as compared to any of the sensor signals of the at least two radiation sensors. In other words, the enhanced image data contains more information about the environment of the helicopter search light than the information contained in any of the at least two radiation sensors alone. In this way, the control of the movement of the movable light head may be improved, as compared to the reliance on one signal source only. For example, the sensor signals may be overlaid by the image processing module, thus providing the potential to mitigate blind spots/low quality regions in one of the sensor signals. It is also possible that the sensor signals are compared to each other via some form of quality measure, such as for example a contrast measure, in order to determine which of the at least two radiation sensors provides higher quality data under the momentary operating conditions. The enhanced image data may then be based solely on the sensor signal of the radiation sensor with the higher/highest quality, supplemented by an explicit or implicit indication that the given sensor signal has a momentarily higher signal quality than the other(s). The sensor signals may also be combined to yield 3D image data, as described below. Any other kind of combination/comparison of the sensor signals that yields additional information is possible as well. The image processing module generating enhanced image data from the sensor signals means that the image processing module processes the sensor signals and derives additional information from relating the sensor signals.

The image proceeding module and the controller may be part of/integrated into the movable light head. It is also possible that the image processing module and the controller are arranged in the helicopter search light, but outside of the movable light head, such as in the stationary portion of the helicopter search light, with respect to which the movable light head moves.

According to a further embodiment, the image processing module includes a 3D image generation module configured for generating 3D image data from said sensor signals and the controller is configured to controlling movement of the movable light head depending on said 3D image data. The 3D image data is an example of enhanced image data. The image processing module may comprise further modules in addition to the 3D image generation module or may comprise the 3D image generation module only.

The sensor signals of the at least two radiation sensors, in combination, comprise depth information, i.e. information about the distance between a detected object and the radiation sensors. This allows generating 3D image data by combining the sensors signals provided by the at least two radiation sensors. By controlling the movement of the movable light head as a function of said 3D image data, the helicopter search light may automatically track a target object. The helicopter search light may in particular automatically compensate for relative movements between the target object and the helicopter. In consequence, a helicopter search light according to an exemplary embodiment of the invention may illuminate the target object with increased reliability, and the risk that the helicopter crew looses sight of the target object may be considerably reduced.

According to a further embodiment, the electromagnetic radiation sensors are configured for detecting electromagnetic radiation in the range of visible light, i.e. radiation having a wavelength in the range of 380 nm to 780 nm; and/or infrared (IR) light, in particular radiation having a wavelength in the range of 900 nm to 2000 nm; and/or ultraviolet (UV) light.

According to a further embodiment, the movable light head includes a first electromagnetic radiation sensor, which is configured for detecting electromagnetic radiation in the range of visible light, i.e. radiation having a wavelength in the range of 380 nm to 780 nm, and a second electromagnetic radiation sensor, which is configured for detecting electromagnetic radiation in the range of IR light, in particular radiation having a wavelength in the range of 900 nm to 2000 nm.

Radiation sensor which are configured for detecting visible light with a high resolution may be provided at comparatively low complexity and/or comparatively low costs. Radiation sensors configured for detecting IR light facilitate detecting living objects, such as human beings, under poor visibility conditions, for example during the night or in a foggy environment.

According to a further embodiment, the at least two radiation sensors are exactly two radiation sensors. They may be two radiation sensors configured for detecting electromagnetic radiation in the range of visible light or two radiation sensors configured for detecting electromagnetic radiation in the range of infrared light or one radiation sensor configured for detecting electromagnetic radiation in the range of visible light in combination with one radiation sensor configured for detecting electromagnetic radiation in the range of infrared light. In the latter case, a comparably high resolution radiation sensor for visible light may be combined with night/fog detection properties of a radiation sensor for infrared light, while providing for above described two-source vision and, potentially, stereo vision and 3D image data generation via depth information.

According to a further embodiment, the at least two different radiation sensors are configured for providing 2D image data, respectively. The at least two different radiation sensors in particular may be provided in the form of cameras. Each camera may include at least one optical element, such as a lens and/or a mirror, which is configured for directing and/or focusing electromagnetic radiation onto the respective radiation sensor.

According to a further embodiment, at least one light source is arranged between the at least two radiation sensors. Increasing the distance between the at least two radiation sensors enhances the depth information provided by the combination of the at least two radiation sensors. Arranging at least one light source between the at least two radiation sensors allows for a compact configuration of the movable light head, in which the at least two radiation sensors are arranged in a relatively large distance from each other.

According to a further embodiment, each light source is associated with at least one optical element, forming a light emitting module. The at least one optical element may in particular be a collimating optical element, for example a collimating lens, a collimating/parabolic reflector, or a combination thereof. The at least one optical element may be configured for forming a light beam from the light emitted by the respective light source. This light beam may be viewed as the light beam of the light emitting module in question, and the light beams of multiple light emitting modules, if present, may form the search light beam of the helicopter search light.

According to a further embodiment, the movable light head comprises a plurality of light emitting modules, configured such that the light emission axes of the light beams emitted by the plurality of light emitting modules are oriented basically parallel to each other, in particular basically parallel to a common light emission axis, resulting in a strong light beam emitted along said common light emission axis.

According to an embodiment, the helicopter search light further comprises a detection module, which is configured for detecting an object in the enhanced image data, in particular in the 3D image data, and/or in the sensor signals provided by the at least two radiation sensors. The detection module in particular may be configured for identifying a detected object, for example as a mobile object such as a human being or an animal, or as a stationary object, such as a tree or a rock. The identification of a detected object also may be based on a detected temperature of the detected object. The detection of the object may be carried out by any suitable object detection algorithm, implemented on the controller and applied to the enhanced image data, in particular the 3D image data, and/or the sensor signals provided by the at least two radiation sensors. The use of such a detection module improves the usability and reliability of the helicopter search light even further.

According to a further embodiment, the controller and/or the detection module is configured for receiving external control commands from outside the helicopter search light. Such external control commands may for example be provided by a pilot of the helicopter and/or other helicopter crew, e.g. for selectively and/or manually following a desired target object and/or selecting a desired target object from a plurality of detected target objects. Such external control commands may also be provided by a helicopter flight controller provided outside and separately from the helicopter search light.

According to a further embodiment, the image processing module, the detection module, if present, and the controller are dedicated hardware components, for example ASICs, which are designed for carrying out the desired tasks. The image processing module, the detection module, and the controller may be discrete hardware components, respectively. Alternatively, two or all of said components may be integrated into a single component, module or electronic circuit.

According to a further embodiment, at least one or a subset of or all of the image processing module, the detection module, if present, and the controller include a microprocessor running at least one software program providing the desired functionalities. The helicopter search light may also comprise a single microprocessor combining the functionalities of the image processing module, the detection module, if present, and the controller.

According to a further embodiment, controlling of the movement of the movable light head is based on changes in enhanced image data, in particular based on changes in 3D image data. The movement of the light head may in particular be based on changes of the enhanced image data, in particular 3D image data, resulting from relative movement between a target object and the helicopter, in order to keep the light beam emitted by the helicopter search light focused on the target object despite said relative movements.

According to a further embodiment, the controller is configured for controlling movement of the movable light head in order to follow a movement of the detected object. In this way, the task of tracking a target object may be performed by the helicopter search light, and the pilot/crew may be freed from the task of tracking a target object and manually operating the helicopter search light. The controller may use any kind of image processing, suitable for tracking an object in a stream of image data. The depth information, as contained in the 3D image data, may help in tracking the target object. In particular, when the target object disappears from the stream of image data, such as when a target person is temporarily concealed by another object, the depth information may help in locating the target object again. In an ongoing stream of 3D image data, the temporarily lost target object may be re-located in a systematic manner, e.g. by examining those portions of the 3D image data first that have a similar distance from the helicopter as the last known location of the target object.

According to a further embodiment, controlling movement of the movable light head includes compensating for a relative movement between an object and the helicopter. The relative movement may be due to the target object moving, e.g. a person moving on the ground, and/or due to the helicopter moving in the air, e.g. in the course of an intended maneuver and/or due to an unintended movement as a result of air turbulence. For the compensating of the relative movement, it is possible to use the helicopter frame of reference as the basis and to track any movement of the target object with respect to said frame of reference. It is also possible to extract a movement of the target object with respect to ground from the enhanced image data, in particular 3D image data, and/or the sensor signals provided by the at least two radiation sensors and to track the helicopter movement with respect to ground from other sources, such as from the various sensors and gauges present in the helicopter.

According to a further embodiment, the at least two radiation sensors and the at least one light source are in thermal contact with a common heat sink. Such a configuration allows for an effective cooling of the components of the movable light head and a very compact structure of the movable light head.

According to a further embodiment, the opening angle of the at least two radiation sensors is larger than the opening angle of the search light beam. Such a configuration allows for detecting radiation which is emitted/reflected from areas outside the area of the emitted light beam. The controller thus may have more awareness of the surroundings than just the illuminated portion thereof.

According to a further embodiment, the opening angle of the search light beam is in the range of 8° to 16°. Such an opening angle has been found as resulting in an light beam which is well suited and efficient for finding and identifying target objects in front of and/or below the helicopter.

According to a further embodiment, the movable light head comprises a plurality of light sources and a plurality of optical elements, in order to enhance the illumination by increasing the amount of light emitted by the movable light head.

According to a further embodiment, the method of operating a helicopter search light includes generating 3D image data from the sensor signals; and controlling movement of the movable light head depending on said 3D image data.

According to a further embodiment, the method of operating a helicopter search light includes identifying a target object, such as a person, within the enhanced image data, in particular the 3D image data, and/or in the sensor signals provided by the at least two radiation sensors; and controlling movement of the movable light head to follow the identified target object.

BRIEF DESCRIPTION OF THE DRAWINGS

Embodiments of the invention are described in greater detail below with reference to the figures, wherein.

DETAILED DESCRIPTION

Figure 1:
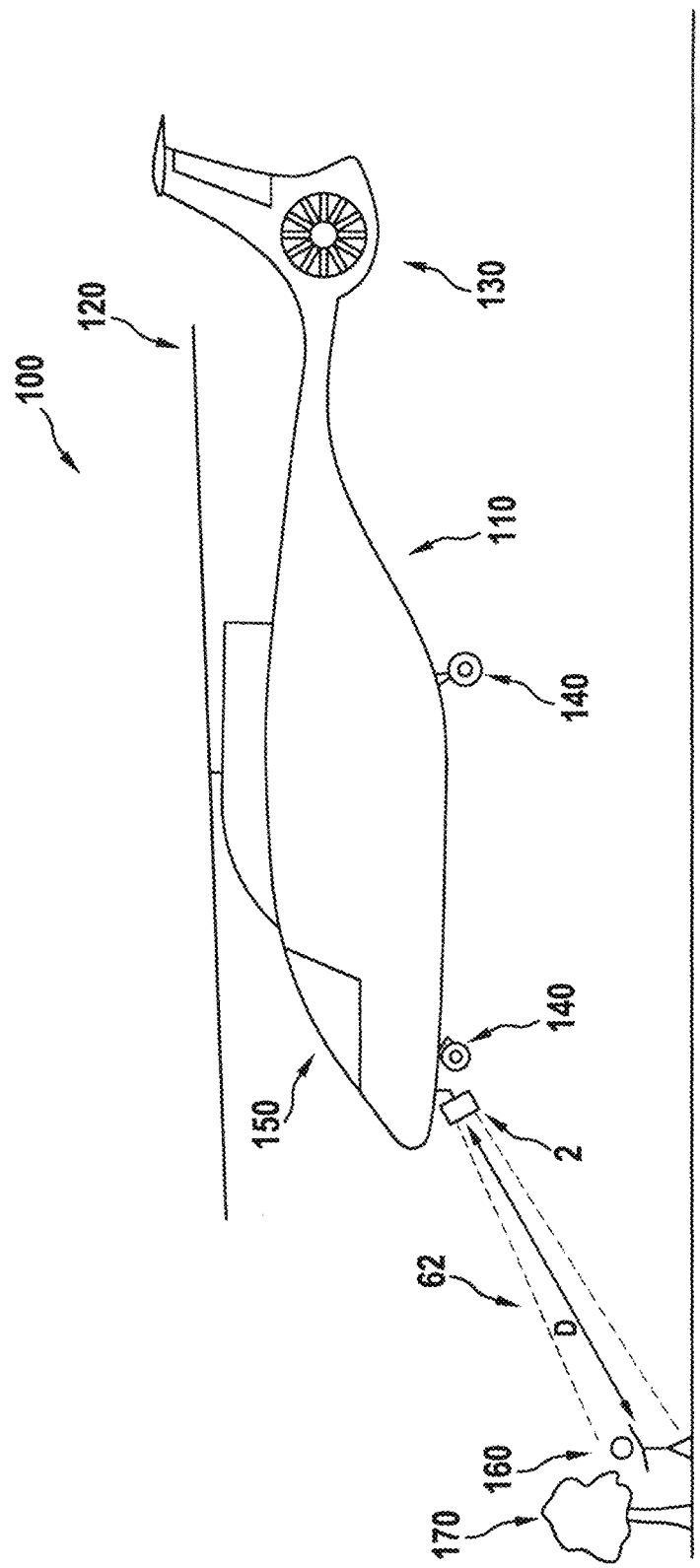
FIG. 1 shows a schematic drawing of a helicopter comprising a helicopter search light according to an exemplary embodiment of the invention.

FIG. 1 shows a schematic side view of a helicopter 100, comprising a helicopter search light 2 according to an exemplary embodiment of the invention.

The helicopter 100 comprises a fuselage 110, a main rotor 120 and a tail rotor 130. Although not explicitly shown in the figures, the helicopter 100 alternatively may comprise two counter-rotating main rotors 120 and no tail rotor 130.

The helicopter 100 further comprises a cockpit 150 and a landing gear 140. The landing gear 140 may include wheels, as shown in FIG. 1, and/or skids (not shown).

A helicopter search light 2 according to an exemplary embodiment of the invention is mounted to the fuselage 110, in particular to a portion of the fuselage 110 below the cockpit 150.

In alternative embodiments, which are not shown in the figures, a helicopter search light 2 additionally or alternatively may be mounted to other portions of the fuselage 110 and/or to the landing gear 140 of the helicopter 100.

The helicopter search light 2 is configured for emitting, in operation, at least one light beam 62 in order to enhance the visibility of objects 160, 170, such as human beings 160, located below and/or in front of the helicopter 100.

Figure 2:
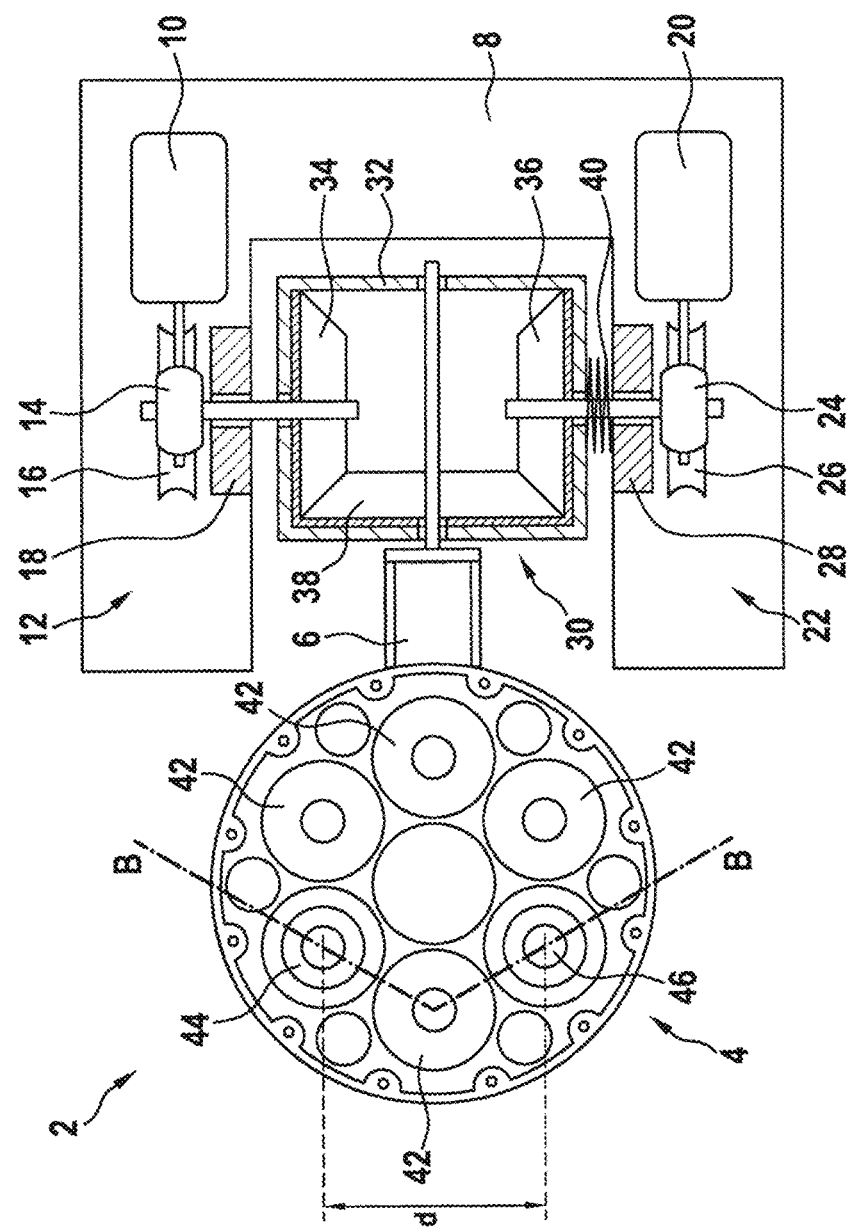
FIG. 2 shows a functional drawing of an exemplary embodiment of a helicopter search light in accordance with an exemplary embodiment of the invention, shown in a partially cut-open top view.

FIG. 2 shows a helicopter search light 2 in accordance with an exemplary embodiment of the invention. FIG. 2 generally is a top view of the helicopter search light 2. When the helicopter search light 2 is mounted to a helicopter 100, this view corresponds to a viewing direction perpendicular to the portion of the helicopter 100 to which the helicopter search light 2 is attached. The view of FIG. 2 is denoted partially cut-open, because some of the components are shown in a cross-sectional way. Also, some of the further elements of the helicopter search light 2, such as a housing, are not depicted for an easier illustration of highly important elements of the helicopter search light 2.

The helicopter search light 2 comprises a mounting plate 8, to which a first motor 10 and a second motor 20 are fixedly attached. The mounting plate 8 is the portion of the helicopter search light 2 that is mounted to the helicopter 100 during the assembly of the helicopter 100. A first support portion 18 and a second support portion 28 are also fixedly attached to the mounting plate 8.

The helicopter search light 2 further comprises a movable light head 4 and a light arm 6. The movable light head 4 is mounted to the movable light arm 6. This allows moving the light head 4 with respect to the fuselage 110 of the helicopter 100 by moving the light arm 6.

The light arm 6 in particular is attached to a connection structure 38 including a shaft portion. In this way, a rotation of a shaft portion of the connection structure 38 results in a rotation of the light arm 6 and therefore of the light head 4. As the shaft portion of the connection structure 38 is rotatably supported in spatially fixed locations of a carrier structure 32, a rotation of the carrier structure 32 results in a tilting of the light arm 6 and therefore of the light head 4 into and out of the drawing plane.

A first spur gear 16 and a second spur gear 26 are mounted to the mounting plate 8. However, the first spur gear 16 and the second spur gear 26 can rotate freely with respect to the mounting plate 8. In other words, the first spur gear 16 and the second spur gear 26 are supported on the mounting plate 8 in such a way that their rotation does not effect the orientation of the mounting plate 8.

The motor shaft of the first motor 10 comprises a first worm 14. The first worm 14 is in engagement with the first spur gear 16, such that a rotation of the motor shaft results in a rotation of the first worm 14 and therefore in a rotation of the first spur gear 16. The first worm 14 and the first spur gear 16 make up a first gear assembly 12.

The second motor 20 has a second worm 24. The second worm 24 is in engagement with the second spur gear 26, such that a rotation of the motor shaft results in a rotation of the second worm 24 and therefore of the second spur gear 26. The second worm 24 and the second spur gear 26 make up a second gear assembly 22.

The helicopter search light 2 further comprises a light arm driving gear assembly 30, which may also be referred to as an inverse differential gear assembly 30. The inverse differential gear assembly 30 in turn comprises the carrier structure 32, a first input gear 34, a second input gear 36, and the connection structure 38. The carrier structure 32 is a cage 32 in the embodiment of FIG. 2. The cage 32 is generally cube-shaped. It is an enclosed structure, with the exception of the holes for the various rotation shafts, described below. In the drawing of FIG. 2, the cage 32 is shown as a rectangle, i.e. with the top plate being cut off, in order to see the interior thereof. The carrier structure 32 is rotatably coupled to the mounting plate 8. In more general terms, the carrier structure 32 is rotatably coupled to a spatially fixed structure, to which the first motor 10 and the second motor 20 are mounted.

The first input gear 34 and the second input gear 36 provide for the support of the cage 32 in such a way that it can rotate with respect to the mounting plate 8. The first input gear 34 has a bevel gear portion and a shaft portion. The shaft portion corresponds with the axis of rotation of the bevel gear portion, such that the bevel gear portion rotates around the shaft of the first input gear 34. While the bevel gear portion is attached to or integrally formed with the bevel gear portion of the first input gear 34 within the carrier structure 32, the other end of the shaft portion is mounted to the first spur gear 16 in such a way that the first spur gear 16 rotates around the shaft portion of the first input gear 34. The shaft portion of the first input gear 34 is rotatably supported in the first support portion 18 and in the side wall of the cage 32. In this way the rotation of the first input gear 34 is independent from the mounting plate 8. It also does not have a direct effect on the position of the carrier structure 32, only through the connection structure 38, as will be explained below.

The second input gear 36 is analogous to the first input gear 34. The second input gear 36 has a bevel gear portion and a shaft portion. The shaft portion corresponds with the axis of rotation of the bevel gear portion, such that the bevel gear portion rotates around the shaft of the second input gear 36. While the bevel gear portion is attached to or integrally formed with the bevel gear portion of the second input gear 36 within the carrier structure 32, the other end of the shaft portion is mounted to the second spur gear 26 in such a way that the second spur gear 26 rotates around the shaft portion of the second input gear 36. The shaft portion of the second input gear 36 is rotatably supported in the second support portion 28 and in the side wall of the cage 32. In this way the rotation of the second input gear 36 is independent from the mounting plate 8. It also does not have a direct effect on the position of the carrier structure 32, only through the connection structure 38, as will be explained below.

The connection structure 38 also has a bevel gear portion and a shaft portion. The bevel gear portion is in engagement with the bevel gear portions of the first input gear 34 and the second input gear 36. The shaft portion of the connection structure 38 is supported in two side walls of the cage 32. In this way, the connection structure 38 can rotate freely in the cage 32. In other words, a rotation of the connection structure 38 can occur independent from any motion of the carrier structure 32.

The helicopter search light 2 further comprises a spring 40. The spring 40 is arranged between the second support portion 28 and the carrier structure 32. It is further arranged around the shaft portion of the second input gear 36. In this position, it pre-loads the engagement between the bevel gear portion of the second input gear 36, the bevel gear portion of the connection structure 38 and the bevel gear portion of the first input gear 34. With this pre-loaded engagement, the torque of the first and second motors 10, 20 can be transferred well to the rotation or tilting of the light head 4.

Movement of the light head 4 of the helicopter search light 2 is described as follows. When the shafts of the first motor 10 and the second motor 20 are driven in the same direction with the same rotational speed, this translates to a rotation of the first input gear 34 and the second input gear 36 in the same direction and a tilting of the light arm 6 and the light head 4. A rotation of the first input gear 34 and the second input gear 36 in the same direction is defined as a rotation in the same direction, when seen from a fixed point of view outside of the helicopter search light 2. In other words, a rotation of the first input gear 34 and the second input gear 36 in the same direction is a rotation that does not lead to a rotation of the connection structure 38.

In particular, the driving of the motor shaft of the first motor 10 results in a rotation of the first worm 14, which results in a rotation of the first spur gear 16, which in turn results in a rotation of the first input gear 34, in particular of the bevel gear portion thereof. The rotation of the motor shaft of the second motor 20 results in a rotation of the second worm 24, which results in a rotation of the second spur gear 26, which in turn results in a rotation of the second input gear 36, in particular of the bevel portion thereof. With the first input gear 34 and the second input gear 36 rotating in the same direction with the same rotational speed, no rotational force around its shaft portion is applied to the connection structure 38. To the contrary, the rotation of the first input gear 34 and the second input gear 36 translates into a rotation of the entire connection structure 38 around the axes of the first input gear 34 and the second input gear 36. This rotation results in a tilting of the shaft portion of the connection structure 38, of the light arm 6, and of the light head 4 with respect to the mounting plate 8, and therefore with respect to the helicopter body.

When the first and second motors 10, 20 drive the motor shafts in different directions with the same speed of rotation, the light arm 6 and light head 4 rotates. On the basis of the transmission of rotation described above, the first input gear 34 and the second input gear 36 rotate in opposite directions when the motor shafts of the first motor 10 and the second motor 20 rotate in opposite directions. With the first and second motors 10, 20 and the first and second gear assemblies 12, 22 being identical, the first input gear 34 and the second input gear 36 exert the same amount of torque on the connection structure 38. Both of these torques exert a force on the connection structure 38, making it rotate around its shaft portion. In other words, the torques of the first input gear 34 and the second input gear 36 add up in order to rotate the connection structure 38 around its shaft portion. The rotation of the connection structure 38 results in a rotation of the light arm 6 and the light head 4. The carrier structure 32 maintains its position during this rotation of the light arm 6 and the light head 4.

In this way, the first and second motors 10, 20 can be controlled to effect a tilting of the light head 4 or a rotation of the light head 4. As the light head 4 has given light emission characteristics comprising a particular spatial light emission distribution, the tilting and rotation of the light head 4 allows for altering this light emission distribution. In particular, the emission direction of a light beam, emitted by the light head 4, can be altered in three dimensions via tilting and rotating of the light head 4.

It is also possible to tilt and rotate the light arm 6 and the light head 4 at the same time. The average of the rotation speeds of the first and second input gears 34, 36 determines the amount of tilting, while the difference of the rotation speeds of the first and second input gears 34, 36 determines the amount of rotation. For these calculations, the sign and value of the rotation speeds have to be taken into account. The effects of different rotation speeds can also be expressed differently. When looking only at the absolute values of the rotation speeds of the first and second input gears, the common part, i.e. the rotation speed of the slower input gear, transfers to a pure tilting or rotating motion (tilting if the directions of rotation are the same, rotating otherwise). The difference between the absolute values of the rotation speeds transfers to a diagonal motion, i.e. a combined tilting and rotating motion. Suitable control of the light head may be provided on the basis of these interdependencies.

The inverse differential gear assembly 30 has many elements of conventional bevel differential gears. However, the use of these elements and the power flow through the differential gear are entirely different. In conventional uses of bevel differential gears, such as in cars, the carrier structure 32 is the part driven by the car engine. Accordingly, the cage 32 would be the power input element. The axes of the car are commonly attached to the shafts of those elements that are denoted the first input gear 34 and the second input gear 36 in the present invention. Accordingly, those elements are the output elements in conventional uses of a bevel differential gear. In the embodiment of FIG. 2, the first and second motors 10, 20 drive the first input gear 34 and the second input gear 36, making them the power input elements of the inverse differential gear 30. Because of this inverse power flow, as compared to conventional uses, the element 30 is referred to as inverse differential gear assembly.

It is to be noted that the structure for movably supporting the light head 4 depicted in FIG. 2 is only exemplary, and that different structures allowing the desired movement of the light head 4 may be employed as well.

The light head 4 depicted in FIG. 2 has a circular outer contour and comprises four light emitting modules 42 and two radiation sensors 44, 46. Each of the light emitting modules 42 and the radiation sensors 44, 46 has a basically circular outer contour, too. The numbers and the shapes of the light emitting modules 42 and the radiation sensors 44, 46 are only exemplary, and alternative geometric configurations of the light head 4 may be employed as well.

Each of the light emitting modules 42 is configured for emitting electromagnetic radiation, in particular emitting electromagnetic radiation in the range of visible light having a wavelength of 380 nm to 780 nm and/or electromagnetic radiation in the range of IR light having a wavelength of more than 900 nm, in particular electromagnetic radiation in the range of 900 nm to 2000 nm.

The radiation sensors 44, 46 are configured for detecting electromagnetic radiation and providing corresponding electric sensor signals.

Details of the light head 4 of the helicopter search light 2 will be discussed in the following with reference to FIG. 3.

Figure 3:
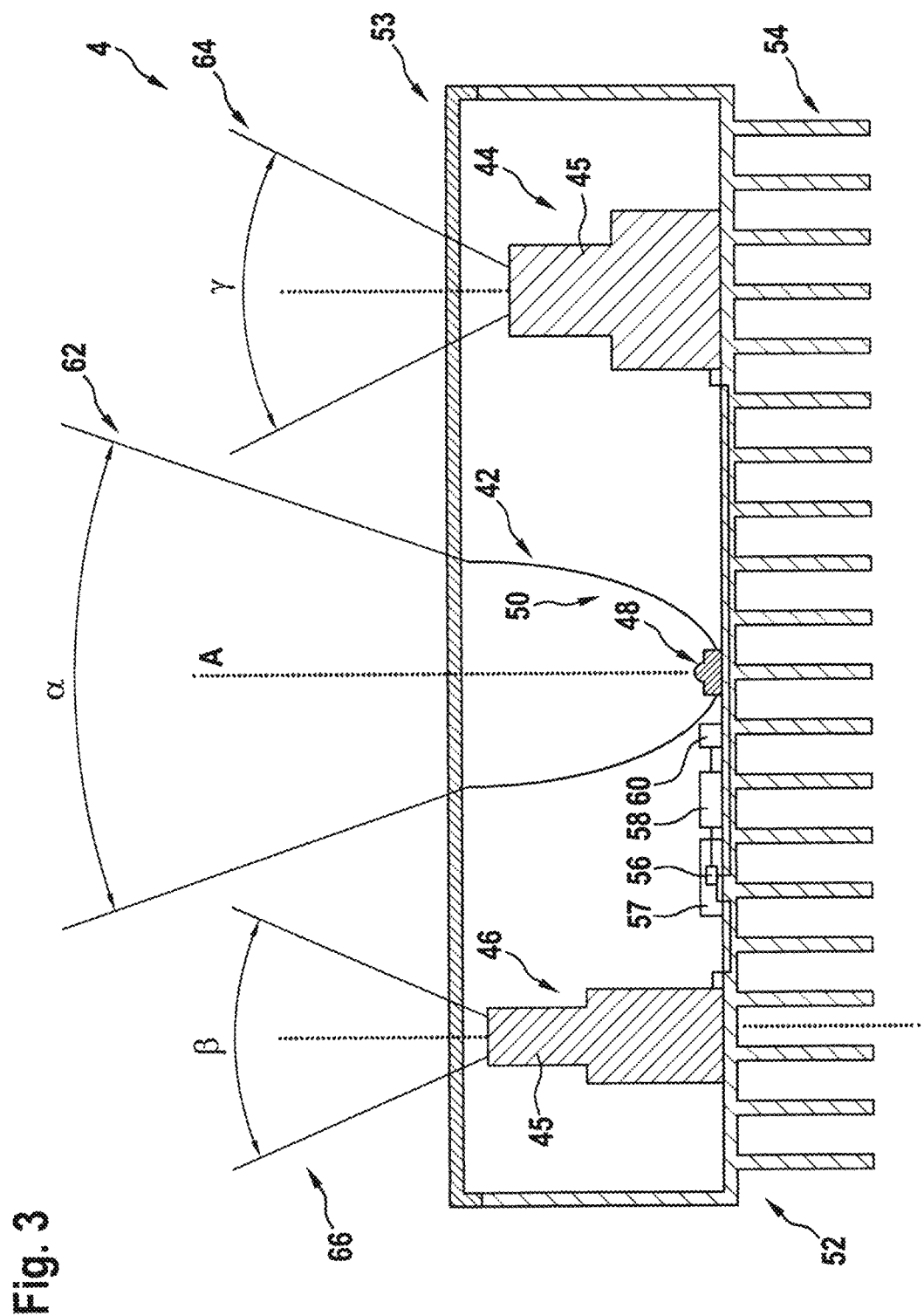
FIG. 3 shows a schematic cross-sectional view of a light head of a helicopter search light in accordance with an exemplary embodiment of the invention.

FIG. 3 shows a schematic cross-sectional view through the light head 4 along line B-B depicted in FIG. 2.

The light head 4 comprises a base plate 52, such as a circuit board, in particular a printed circuit board, supporting the light emitting modules 42, only one of which is visible in FIG. 3, and the radiation sensors 44, 46.

The base plate 52 may be formed as or may be in contact with a heat sink 54, which is configured for dissipating heat generated by operating the light emitting modules 42 and the radiation sensors 44, 46. The heat sink 54 may comprise one or more cooling ribs extending from the base plate 52.

Each of the light emitting modules 42 comprises at least one light source 48, in particular an LED, and at least one optical element 50, in particular a collimating optical element 50, such as a reflector and/or a lens. The at least one optical element 50 is configured for modifying the light emitted by the at least one light source 48 forming a light beam 62, which is emitted from each of the light emitting modules 42, respectively. The light beam 62 is emitted through a lens cover 53 of the light head 4.

Generally the plurality of light emitting modules 42, comprised in the light head 4, are configured such that the light beams 62 emitted by the plurality of light emitting modules 42 are oriented basically parallel to each other, in particular basically parallel to a common light emission axis A.

The light beams 62, emitted by the light emitting modules 42, add up to form the search light beam of the helicopter search light. The search light beam may have an opening angle α in the range of 8° to 16°. Each of the light beams 62 of the light emitting modules 42 may also have an opening angle α in the range of 8° to 16°. The opening angles of the light beams of the individual light emitting modules 42 may be similar to or substantially correspond to the opening angle of the search light beam.

The opening angles β, γ of the detection ranges 64, 66 of the radiation sensors 44, 46 may be slightly larger than the opening angle α of the light beams 62.

The opening angles β, γ of the detection ranges 64, 66 in particular may be in the range of 5°-15°.

The at least two radiation sensors 44, 46 are configured for providing 2D image data, respectively. The radiation sensors 44, 46 are provided in the form of cameras. Each camera includes an optical system 45, comprising one or more optical elements, such as one or more lenses and/or one or more reflectors and/or one or more shutters. The optical system 34 is configured for directing and/or focusing electromagnetic radiation onto the detection portion of the respective radiation sensor 44, 46.

The electromagnetic radiation sensors 44, 46 may be configured for detecting electromagnetic radiation in the range of visible light, i.e. radiation having a wavelength in the range of 380 nm to 780 nm; IR light, in particular radiation having a wavelength of more than 900 nm; and/or UV light.

In particular, a first radiation sensor 44 may be configured for detecting visible light, and a second radiation sensor 46 may be configured for detecting IR light.

A radiation sensor 44, which is configured for detecting visible light with a high 2D resolution, may be provided at comparatively low costs. A radiation sensor 46, detecting IR light, facilitates detecting objects 160, 170, such as human beings 160, under poor visibility conditions, for example during the night or under rainy and/or foggy ambient conditions.

Thus, the proposed combination of at least two radiation sensors 44, 46 having different sensitivity characteristics provides optimized detection signals under varying ambient conditions.

The at least two radiation sensors 44, 46 are arranged in a preset spatial distance d (see FIG. 2) from each other. As a result, depth information indicating the distance D (see FIG. 1) between the helicopter search light 2 and a detected object 160, 170, may be extracted from the combination of the signals provided by the at least two radiation sensors 44, 46. In consequence, 3D image data may be generated by combining the 2D information provided by each of the at least two radiation sensors 44, 46 with the 2D information provided by the at least one other radiation sensor 44, 46.

The helicopter search light 2 further comprises an image processing module 57, including a 3D image generation module 56, in particular a 3D image generation circuit. The 3D image generation module 56 is coupled to the radiation sensors 44, 46 for receiving the sensor signals provided by the radiation sensors 44, 46. The 3D image generation module 56 is configured for generating 3D image data from the received sensor signals. The 3D image generation module may comprise any suitable algorithm for generating 3D image data from the 2D image data, provided by the radiation sensors 44, 46.

The helicopter search light 2 also comprises a detection module 58, which is configured for receiving the 3D image data generated by the 3D image generation module 56 and for identifying objects 160, 170, in particular human beings 160 or stationary objects 170, such as rocks or trees, within said received 3D image data.

Methods of image processing, such as a Kalman-Filter, may be employed for identifying objects 160, 170 within the 3D image data.

The helicopter search light 2 further comprises a controller 60, which is configured for controlling movement of the movable light head 4 as a function of the 3D image data generated by the 3D image generation module 56. The controller 60 in particular may be configured for controlling movement of the movable light head 4 as a function of a change of the 3D image data over time.

Alternatively or additionally, the controller 60 may be configured for controlling movement of the movable light head 4 based on data provided by the detection module 58. The controller 60 in particular may be configured for controlling the movement of the light head 4 so that the light beam 62 emitted by the helicopter search light 2 follows a detected object 160, 170, in particular a human being 160, which has been identified in the 3D image data by the detection module 58, even when the object 160, 170 and the helicopter 100 move with respect to each other.

The automatic control in particular may compensate for movements of the tracked object 160, 170 as well as for movements of the helicopter 100, which may cause the light beam 62 to deviate from the tracked object 160, 170.

Automatically controlling the movement of the light head 4 makes it easier for the helicopter crew to track objects 160, 170 with the light beam 62, in particular under adverse conditions such as poor visibility and/or heavy winds.

While it has been described with respect to FIG. 3 that the image processing module 57 includes the 3D image generation module 56 and that the controller 60 is configured to control movement of the movable light head on the basis of the 3D image data, it is stressed that the image processing module 57 may additionally/alternatively be configured to perform different kinds of signal processing on the sensor signals from the radiation sensors 44, 46 and to relate said sensor signals in other manners to generate enhanced image data, on the basis of which the controller 60 may control movement of the movable light head.

The image processing module 57, the detection module 58, and the controller 60 may be dedicated hardware components, such as ASICs, designed for carrying out the desired tasks. The image processing module 57, the detection module 58, and controller 60 may be discrete hardware components, as depicted in FIG. 3, or they may be integrated into a single component, module or electronic circuit, respectively.

At least one of the image processing module 57, the detection module 58, and the controller 60 may include a microprocessor running at least one software program providing the desired functionalities.

The image processing module 57, the detection module 58, and the controller 60 may be arranged in the movable light head 4, in particular on the same base plate 52 as the light emitting modules 42 and the radiation sensors 44, 46, as it is depicted in FIG. 3.

The image processing module 57, the detection module 58, and the controller 60, however, also may be arranged in different portions of the helicopter search light 2, in particular outside the movable light head 4, for example for reducing the weight of the movable light head 4.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. A helicopter search light comprising:
a movable light head, wherein the movable light head comprises:
at least one light source and at least one optical element, which are configured for emitting a search light beam; and
at least two radiation sensors arranged in a preset distance (d) from each other, the radiation sensors being configured for detecting electromagnetic radiation and providing corresponding sensor signals;
an image processing module configured for receiving the sensor signals provided by the at least two radiation sensors and generating enhanced image data from said sensor signals; and
a controller configured for controlling movement of the movable light head depending on said enhanced image data.

2. The helicopter search light according to claim 1, wherein the image processing module includes a 3D image generation module configured for generating 3D image data from said sensor signals and wherein the controller is configured to controlling movement of the movable light head depending on said 3D image data.

3. The helicopter search light according to claim 1, wherein the at least two radiation sensors include at least one radiation sensor configured for detecting electromagnetic radiation in the range of visible light having a wavelength in the range of 380 nm to 780 nm.

4. The helicopter search light according to claim 1, wherein the at least two radiation sensors include at least one radiation sensor configured for detecting electromagnetic radiation in the range of infrared light having a wavelength of at least 900 nm.

5. The helicopter search light according to claim 1, wherein the movable light head comprises a first electromagnetic radiation sensor, which is configured for detecting electromagnetic radiation in the range of visible light, and a second electromagnetic radiation sensor, which is configured for detecting electromagnetic radiation in the range of infrared light.

6. The helicopter search light according to claim 1, further comprising:
   a detection module, which is configured for detecting an object in the enhanced image data and/or in the sensor signals provided by the at least two radiation sensors, wherein the detection module in particular is configured for identifying the detected object as a mobile object or as a stationary object, respectively.

7. The helicopter search light according to claim 6, wherein the controller is configured for controlling movement of the movable light head in order to follow a movement of the detected object.

8. The helicopter search light according to claim 1, wherein the at least two radiation sensors and the at least one light source are in thermal contact with a common heat sink.

9. The helicopter search light according to claim 1, wherein an opening angle ($\beta$, $\gamma$) of the at least two radiation sensors is larger than an opening angle ($\alpha$) of the search light beam and/or wherein the opening angle ($\alpha$) of the search light beam is in the range of 8° to 16°.

10. The helicopter search light according to claim 1, wherein the movable light head comprises a plurality of light sources and a plurality of optical elements.

11. The helicopter search light according to claim 1, wherein the controller is configured for receiving external control commands from outside the helicopter search light.

12. The helicopter search light according to claim 1, wherein controlling movement of the movable light head includes compensating for a relative movement between an object and the helicopter.

13. A helicopter comprising:
   at least one helicopter search light according to claim 1.

14. A method of operating a helicopter search light having a movable light head, wherein the method includes:
   emitting a search light beam from the movable light head;
   detecting electromagnetic radiation from the environment with the at least two radiation sensors, arranged in a preset distance (d) from each other in the movable light head, and providing corresponding sensor signals;
   generating enhanced image data from said sensor signals; and
   controlling movement of the movable light head depending on said enhanced image data; wherein the controlling of the movement of the movable light head in particular includes compensating for a relative movement between an object and the helicopter.

15. The method according to claim 14, wherein the method further includes:
   identifying an object, such as a person, within the enhanced image data and/or in the sensor signals provided by the at least two radiation sensors; and
   controlling movement of the movable light head to follow the identified object.

* * * * *